April 8, 1958 A. G. MEAKER Re. 24,452

COLLAPSIBLE HOUSE TRAILER

Original Filed Dec. 27, 1954 2 Sheets-Sheet 1

INVENTOR.
ARCHIBALD G. MEAKER.
BY William S. Grant
ATTORNEY.

COLLAPSIBLE HOUSE TRAILER

Original Filed Dec. 27, 1954 2 Sheets-Sheet 2

INVENTOR.
ARCHIBALD G. MEAKER.
BY
Willard S. Grant
ATTORNEY.

United States Patent Office

Re. 24,452
Reissued Apr. 8, 1958

24,452

COLLAPSIBLE HOUSE TRAILER

Archibald G. Meaker, Corona, Calif.

Original No. 2,732,251, dated January 24, 1956, Serial No. 477,691, December 27, 1954. Application for reissue November 13, 1956, Serial No. 621,976

5 Claims. (Cl. 296—23)

Matter enclosed in heavy brackets [ ] appears in the original patent but forms no part of this reissue specification; matter printed in italics indicates the additions made by reissue.

This invention pertains to improvements in collapsible house trailers and is particularly directed to an improved operating and control mechanism to facilitate the opening and closing of the collapsible trailer with a minimum of effort and skill being required by the operator.

One of the objects of this invention is to provide an improved collapsible house trailer and operating mechanism which may be controlled by one person to effect the entire opening and closing of the trailer.

Still another object of this invention is to provide an improved collapsible house trailer having side portions telescopically movable into and out of a main frame section with a minimum of effort required upon the part of one person only.

Still another object of this invention is to provide an improved house trailer which is stable at all times when opening and closing the collapsible side portions thereof and only requiring the efforts of a single person to put the collapsible trailer into service or to collapse it ready for highway travel.

Still another object of this invention is to provide an improved operating mechanism for opening and closing a collapsible trailer operable by fluid pressure means under the simple manipulation of control valve mechanism by only one person.

Still another object of this invention is to provide in a collapsible house trailer having a folding floor, means to facilitate the locking in and folding up of the floor structure in the form of pop-up cylinders to initially break the locked-in expanded flat condition of the floor to the folded condition.

Still another object of this invention is to provide an improved hydraulic fluid pressure system for operating a collapsible trailer having a folding floor.

Further features and advantages of this invention will appear from a detailed description of the drawings in which.

Figure 1:
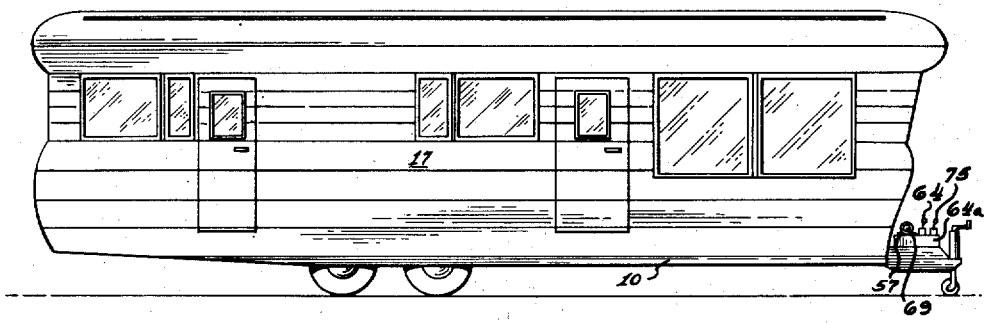
Fig. 1 is a side elevation of a trailer incorporating the features of this invention.
Figure 3:
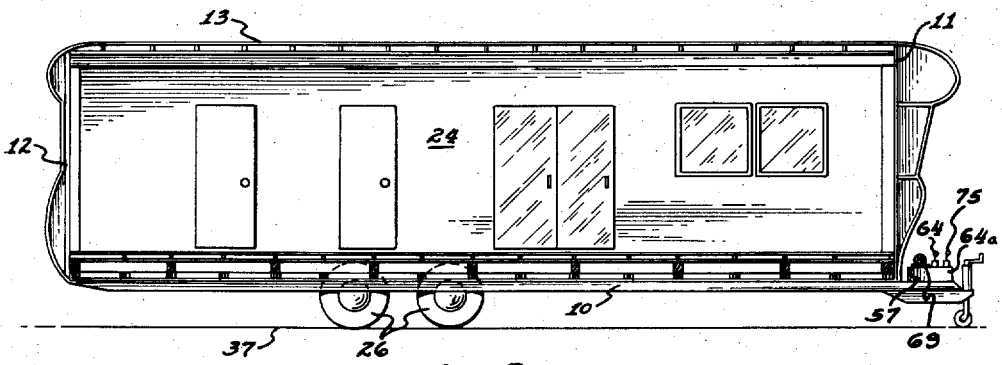
Fig. 3 is a vertical longitudinal section on the line 3—3 of Fig. 2.

As an example of one embodiment of this invention there is shown a collapsible house trailer having the main chassis frame 10 on the ends of which are rigidly fixed the front outer wall 11 and the rear outer wall 12. The central top 13 is rigidly connected to the tops of the outer front and rear walls 11 and 12 to form a complete rigid structure with the chassis frame 10.

Telescopically arranged to slide into and out of this main frame structure are the side portions 14 and 15, the side portion 14 comprising the rigid floor piece 16, the outside side wall 17, and the roof portion 18 connected by suitable side walls 19 with the floor portion 16. This entire unit is suitably mounted on telescopic side members indicated at 20. In a similar manner the side portion 15 comprises the floor portion 21, the roof portion 22 and suitable end portions 23 interconnecting the outside wall 24 with the floor portion 21. Likewise the floor 21 and the side portion 15 are supported on suitable telescopic joists or slides indicated at 20 in any suitable manner. These side members 14 and 15 can move from a totally collapsed position shown in Fig. 6 to the outstretched position shown in Fig. 4.

The road wheels 25 and 26 are respectively carried on the side portions 14 and 15 by suitable springs 27 and suspension mechanism. The wheel 25 is carried on an axle 28 which telescopically slides in a tube 29 suitably carried on the chassis frame 10 to allow normal functioning of the springs 27 for the road wheels 26. Similarly, the wheel 26 is supported through the spring 27 and the axle 30 which likewise is slidably supported in a suitable bearing 31 in the tube 29 and may telescopically pass into the hollow axle 28 of the wheel 25.

Figures 4, 5, 6, 7:
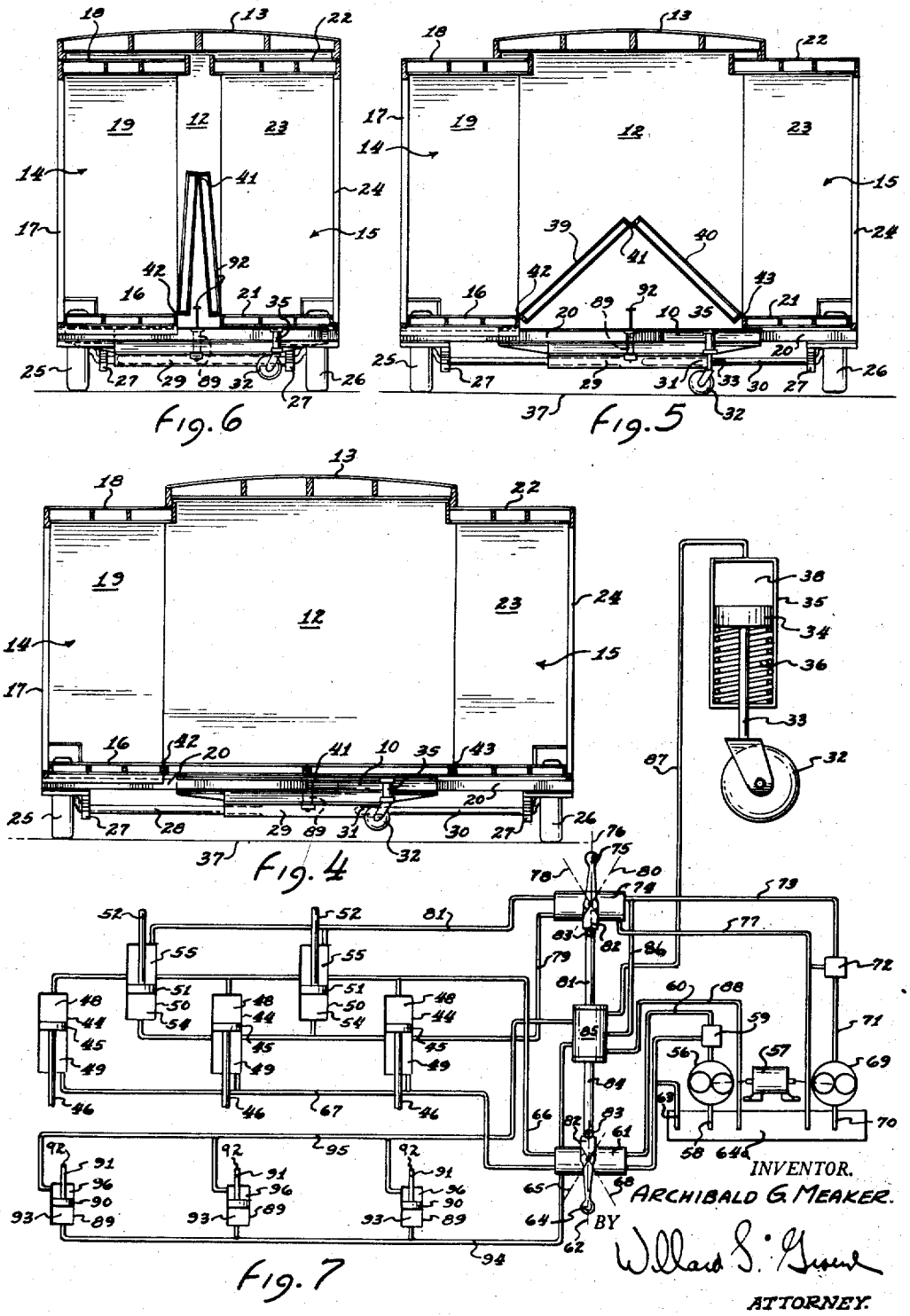
Fig. 4 is a section on the line 4—4 of Fig. 2 showing the trailer in expanded position.
Fig. 5 is a view similar to Fig. 4 but showing the trailer partially collapsed.
Fig. 6 is a view showing the trailer fully collapsed ready for road travel.
Fig. 7 is a hydraulic diagram of the operating mechanism for the collapsible house trailer.

A suitable lift-up caster 32 carried on the piston rod 33 of the lift-up piston 34 carried in the lift-up cylinder 35, which cylinder 35 is rigidly fixed to the chassis frame 10 but at one side thereof as best seen in Figs. 4, 5 and 6. Behind the piston 34 is provided a compression spring 36 to normally retract the piston rod 33 and caster roller 32 from the road surface 37 when fluid pressure is released from the pressure chamber 38 of the caster lift-up cylinder 35. The purpose of this caster lift-up cylinder is that when pressure is applied in its pressure chamber 38 the roller 32 will be forced downwardly against the road surface and will lift one wheel, the wheel 26 in Figs. 4, 5 and 6, from the road surface to permit freedom of telescopic movement and relative movement of the wheels 25 and 26 during the opening and closing of the collapsible house trailer.

Figure 2:
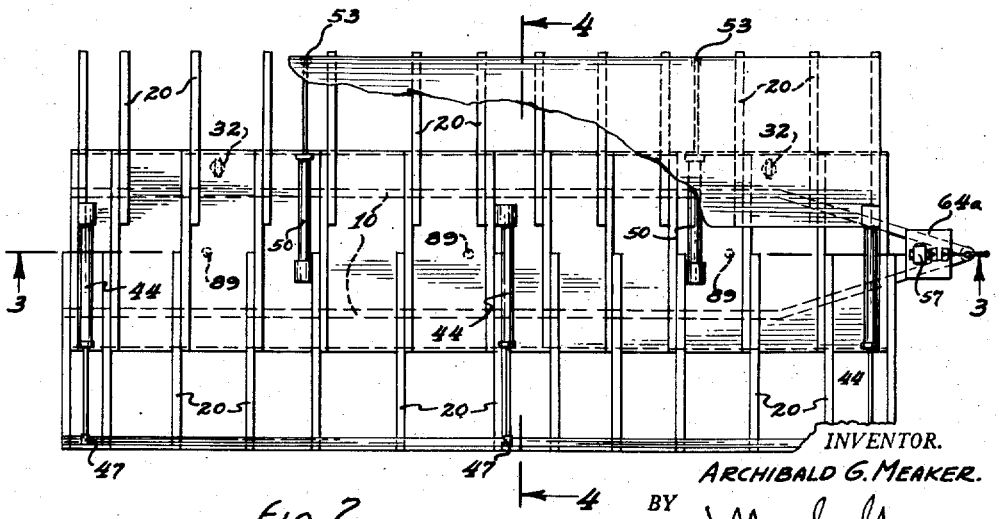
Fig. 2 is a plan view partly broken away showing the expandable floor structure of the trailer of Fig. 1.

Between the floor pieces 16 and 21 of the side portions 14 and 15 there is provided a jackknife floor structure comprising the jackknife floor element 39 and the jackknife floor element 40. These two elements are hinged together at their lower edges at a point 41 extending longitudinally of the trailer structure. Their other ends are hinged at their top edges respectively for the jackknife floor element 39 at the point 42 with the floor piece 16 and at the point 43 with the floor piece 21. Thus, as the trailer is expanded from the position shown in Fig. 6 to the intermediate position shown in Fig. 5 to the fully opened position shown in Fig. 2, the floors swing down from their relatively vertical position in Fig. 6 to the final flat locked-in horizontal position of Fig. 4.

The side portion 14 is actuated in and out on the telescopic slide members 20 by a series of fluid pressure cylinders 44, each of which is fixed to the chassis frame member 10 and has a piston 45 and a piston rod 46, the latter of which is connected at 47 to the side portion 14 so that reciprocation of the pistons 45 by appropriate application of fluid pressure to the pressure chambers 48 and 49 of the cylinders 44 causes extension or retraction of the side member 14 of the collapsible trailer. Similarly, a series of cylinders 50 rigidly fixed to the chassis frame 10 have pistons 51 and piston rods 52 suitably connected at 53 to the side portion 15 so that appropriate application of fluid pressure to the pressure chambers 54 and 55 of the cylinders 50 effects appropriate movement of the side member 15 to and from retracted position on the telescopic guideways 20.

Each side portion 14 and 15 is actuated from separate fluid pressure pumps driven by a suitable electric motor 57. The side 14 is actuated by the fluid pressure pump 56 receiving fluid through the suction line 58 and transmits it through a pressure relief valve 59 to the pressure supply line 60. The pressure supply line 60 is connected to the control valve 61 which, when in neutral position 62 connects the fluid pressure to the drain line 63 for return to the reservoir 64a. When the control valve lever 64 is moved to the position 65 the fluid pressure 60 is then connected to the line 66 and to the pressure chambers 48 of the cylinders 44 while the pressure chambers 49 of the cylinders 44 are connected through the line 67 through the valve 61 to the drain line 63 so that the side portion 14 is moved outwardly. Likewise, by moving the control lever 64 to position 68 pressure from the line 60 is then connected to the line 67 and the line 66 is connected to the drain line 63 to reverse the operation of the cylinders 44 and thus retract the side portion 14 of the trailer.

Fluid pressure for the cylinders 44 is derived from the fluid pressure pump 69 having the suction line 70 and the pressure discharge line 71 connected to a suitable relief valve 72 from which fluid pressure is transmitted into the pressure supply line 73 connected to the control valve 74. When the control level 75 of the control valve 74 is in neutral position 76, fluid pressure from the line 73 is connected to the drain line 77 for return to the reservoir 64a. When the control valve lever 75 is moved to the position 78 fluid pressure from the line 73 is connected into the line 79 to the pressure chambers 54 of the cylinders 50 so as to move the side portion 15 outwardly. When the control lever 75 of the valve 74 is moved to the position 80 fluid pressure from the line 73 is connected to the line 81 for pressure supply to the chambers 55 of the cylinders 50, in both instances of position of the lever 75 in position 78 or 80 the opposite pressure chamber being connected through the valve 74 to the drain line 77. Thus, the side member 15 may be moved inwardly or outwardly by appropriately regulating the position of the lever 75 of the valve 74.

Since the road wheels 25 and 26 are each respectively carried on the side portions 14 and 15 they must freely move relative to one another during the expansion and contraction of the trailer. Thus, by providing the lift-up caster wheels 32, one side and wheel 26 of the trailer is raised from the ground so this relative telescopic movement can take place. This action, however, is provided automatically in applicant's arrangement by the manipulation of either or both of the control levers 64 and 75 of their corresponding valves from the neutral positions thereof. On each of the levers 64 and 75 there is provided a cam segment 82 which engages the rollers 83 of the control rods 81 and 84 for the control valve 85 so that whenever either one or both of the control rods 81 and 84 of the valve 85 are depressed by manipulation of the lever 64 or 75 fluid pressure from the line 73 and the line 86 is connected to the line 87 which in turn supplies fluid pressure to the pressure chamber 38 of the caster lifting cylinder 34 so as to automatically lift one side of the trailer, the wheels 26, whenever either or both sides of the trailer are to be moved in or out by manipulation of the handles 64 and 75. Whenever these handles are returned to their neutral position shown in Fig. 7 the valve 85 is controlled through its control rods 81 and 84 and the cam segments 82 so as to then block off the line 86 and connect the line 87 from the pressure chamber 38 of the caster cylinder 34 to the drain line 88 to allow the piston 34 to retract upwardly under the influence of the compression spring 36 and the weight of the trailer.

Referring to Fig. 4, it will be noted that when the trailer has been fully extended with all of the floor pieces in horizontal alignment that it would be impossible to again retract one or both of the sides by the fluid pressure means described since the floor members 39 and 40 have locked in on dead center. In order to make the unit fully automatic, there is provided a series of pop-up cylinders 89 each mounted in vertical position on the chassis frame 10 and having pistons 90 and piston rods 91 terminating in abutment ends 92 which are adapted to engage the jackknife floor elements 39 and 40 at their hinged point 41 when fluid pressure is applied in the pressure chamber 93 of the pop-up cylinders. Assuming that the floors have been fully extended to the horizontal position shown in Fig. 4 and either or both of the control levers 64 and 75 are moved to their respective positions 68 or 80, fluid pressure will then be provided in the retraction chambers respectively 49 and 55 of the side portion moving cylinders 44 and 50. But they are ineffective initially to cause retraction of the side portions 14 and 15 because the jackknife floor elements 39 and 40 are in dead center. At the same time, however, through the medium of the valve 85 actuated by the cam segments 82 of the control valve levers 64 and 75 fluid pressure is applied from the pressure line 86 into the line 94 to the pressure chambers 93 of the pop-up cylinders 89. Since it takes relatively little pressure for the cylinders 89 to operate and push their piston rods and abutment ends 92 upwardly against the hinge point 41 of the jackknife floor elements 39 and 40, these floor elements are easily raised at the point 41 to break their dead center condition. Once the dead center condition has been passed by the operation of the pop-up cylinders 89, the then retracting cylinders 44 and 50 become immediately effective to complete their work to move the sides to any desired retracted position. In the outward movement of the unit by the cylinders 44 and 50 the floors automatically drop into dead center position as shown in Fig. 4. At this time the valve 85 is actuated by positioning the levers 64 and 75 for forward moving position through the medium of their cams 82 to apply pressure then from the line 86 to the line 95 which applies pressure in the retraction pressure chambers 96 to have the plungers 91 back down out of the way so that the floors may easily drop into aligned horizontal locked-in position shown in Fig. 4.

There has thus been provided a telescopic house trailer which may be easily put into operation or retracted for road travel by a single operator manipulating the two control levers 64 and 75. He can open one side or the other or both sides and in doing so the road wheels are automatically lifted up from the road surface by the caster cylinder 35 and automatically placed back down on the wheels at the completion of the desired position of opening of the trailer. Furthermore, when the floors have been moved out to fully expanded position and locked in dead center, the unit will automatically provide means in the form of the pop-up cylinders to break the dead center and make it possible to easily retract the side units of the trailer to retracted position of road travel again, all of the aforesaid functioning being carried out fully and automatically by manipulation of the control levers 64 and 75 by a single operator.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appended claims are intended to be included herein.

Having thus fully set forth and described this invention what is claimed and desired to be obtained by United States Letters Patent is:

1. In a collapsible house trailer having a chassis frame, a pair of oppositely disposed side floor pieces movable transversely on said chassis frame, a pair of jackknife floor elements pivotally connected to each other and to the inner edges of said side floor pieces, road engaging wheels mounted on each of said side floor pieces, a lift-up caster mounted on one side of said chassis frame, fluid pressure means for actuating said caster to raise the road wheels on one side of said trailer for contact with the ground surface, fluid pressure means for extending and retracting each of said side floor pieces, pop-up fluid pressure means engaging said jackknife floor element at their pivotal interconnection when in horizontal dead center position, control means for applying fluid pressure to either of said fluid pressure means for extending and retracting said side floor pieces, further fluid pressure control means operable by the movement of said control means for the side floor pieces to raise said pop-up fluid pressure means when either of said side floor pieces are retracted and to lower said pop-up fluid pressure means when either of said side floor pieces are extended, and still further fluid pressure control means operable wherever said side floor pieces are retracted or extended to cause fluid pressure means for said caster to operate to raise one wheel of said trailer.

2. A fluid pressure system for a collapsible floor structure having a frame, oppositely disposed side floor pieces slidable laterally on said frame, jackknife floor elements hinged together at their inner edges and hinged at their outer edges to the inner edges of said side floor pieces, a first fluid pressure cylinder fixed on said frame having a piston rod connected to actuate one of said side floor pieces, a second fluid pressure cylinder fixed on said frame having a piston rod connected to actuate the other of said floor pieces, a pop-up cylinder fixed on said frame having a piston rod with an abutment end engaging the underside of said jackknife floor elements at their hinged connection, a caster lift-up cylinder fixed on said frame having a downwardly extending piston rod with ground engaging caster roller mounted thereon, a first source of fluid pressure connected to a first control valve operable to effect reciprocation of said first pressure cylinder, a second source of fluid pressure connected to a second control valve operable to effect reciprocation of said second fluid pressure cylinder, a third control valve connected to one of said sources of fluid pressure actuated by the movement of either of said first and second control valves to cause operation of said pop-up cylinders and said elevating cylinder.

3. In a collapsible floor operating mechanism, a chassis frame, a pair of spaced floor pieces movable horizontally on said chassis frame relative to each other, means to independently and simultaneously actuate said floor pieces, jackknife floor elements hinge connected together and hinge connected between the inner edges of said spaced floor pieces, pop-up actuating means adapted to engage the underside of the hinged connection between said jackknife floor elements to break dead center of said jackknife elements when in fully extended horizontal position with said extended spaced floor pieces, road wheels mounted on each of said floor pieces, and a lift-up caster mounted on said chassis frame energizable to raise the wheels on one of said spaced floor pieces whenever said spaced floor pieces are moved relative to one another.

4. A fluid pressure actuating device for automatically opening and closing a collapsible trailer having, a frame, a pair of horizontally transversely slidable floor elements on said frame, an upwardly folding jackknife floor structure connected pivotally between said slidable floor elements and pivotally connected to each other, a first pair of actuating cylinders interconnected between said frame and one of said slidable floor elements, a first pump on said frame for supplying fluid pressure for said first cylinders, a first control valve for applying pressure from said first pump to reciprocate an actuating piston and rod in said first cylinders, a second pair of actuating cylinders interconnected between said frame and the other of said floor elements, a second pump on said frame for supplying fluid pressure to reciprocate an actuating piston and rod in said second cylinders, vertically disposed cylinders on said frame having piston rods engaging said jackknife floor structure at their hinged interconnection, a lifting caster cylinder on said frame, a third control valve operated by the independent and simultaneous operation of said first and second control valves to energize said caster cylinder, and further means in said third valve to direct fluid pressure from one of said pumps to cause said vertically disposed cylinders to raise said folding floor structure from dead center horizontal position whenever said first and second control valves to said actuating cylinders for said slidable floor elements are operated.

*5. In a laterally expansible and contractible trailer, a body having a medial road wheel-supported chassis portion and opposite side portions arranged for lateral movement toward and away from each other relative to said chassis portion, a pair of juxtaposed floor elements having their outer side edges pivotally engaging said side portions and being alternately movable between upright jackknife contracted position and horizontal expanded position in response to said movement of said side portions, hydraulic actuating means for so moving said side portions, hinge means pivotally securing the contiguous side edge portions of said floor elements together, said hinge means being disposed to be in dead center position when said floor elements are in said expanded position, and a hydraulic jack comprising a cylinder and piston disposed below the contiguous side portions of said floor elements in such position that said piston, when elevated, will contact and raise said contiguous side edge portions only sufficiently to break the dead center position of said hinge means, whereby to permit said floor elements to be moved into jackknifed position in response to inward movement of said side portions.*

References Cited in the file of this patent or the original patent

UNITED STATES PATENTS

| | | |
|---|---|---|
| 2,147,892 | Gray | Feb. 21, 1939 |
| 2,150,615 | Sword | Mar. 14, 1939 |
| 2,168,062 | Davey | Aug. 1, 1939 |
| 2,355,663 | McGlothlin | Aug. 15, 1944 |
| 2,636,773 | Van Tassel | Apr. 28, 1953 |

FOREIGN PATENTS

| | | |
|---|---|---|
| 528,037 | Canada | July 24, 1956 |
| (Corresponding Swiss Patent 285,325, Jan. 5, 1953) | | |
| 1,015,333 | France | July 9, 1952 |
| 1,068,990 | France | Feb. 10, 1954 |